United States Patent [19]

Enga

[11] 4,287,856
[45] Sep. 8, 1981

[54] ENGINES

[75] Inventor: Bernard E. Enga, Maidenhead, England

[73] Assignee: Johnson, Matthey & Co., Limited, London, England

[21] Appl. No.: 35,826

[22] Filed: May 4, 1979

[30] Foreign Application Priority Data

May 8, 1978 [GB] United Kingdom ............... 18240/78

[51] Int. Cl.³ .............................................. B09B 3/00
[52] U.S. Cl. .................................... 122/4 D; 60/723; 431/170
[58] Field of Search ................... 431/7, 170; 122/4 D; 60/39.02, 39.69 A; 252/465, 462, 477 R

[56] References Cited

U.S. PATENT DOCUMENTS

| | | | |
|---|---|---|---|
| 3,857,668 | 12/1974 | Koch | 431/7 |
| 3,870,455 | 3/1975 | Hindin | 431/7 |
| 3,928,961 | 12/1975 | Pfefferle | 431/7 X |
| 3,966,391 | 6/1976 | Hindin | 431/7 |
| 4,047,877 | 9/1977 | Flanagan | 431/7 X |
| 4,088,435 | 5/1978 | Hindin et al. | 431/7 |
| 4,154,568 | 5/1979 | Kendall et al. | 431/7 |

Primary Examiner—Edward G. Favors
Attorney, Agent, or Firm—Cushman, Darby & Cushman

[57] ABSTRACT

This invention relates to Rankine cycle engines and to improved methods of operation whereby catalytic oxidation of a major proportion of the fuel takes place in the boiler section of the engine.

In order to improve the operation of a Rankine engine, the engine is modified to include a combustor having a thermally stable and oxidation resistant monolith containing a multiplicity of flow paths or channels, the monolith being made from a catalyst material or supporting a catalyst material for the catalytic combustion of the combustible gases and injected fuel.

9 Claims, 1 Drawing Figure

U.S. Patent  Sep. 8, 1981  4,287,856
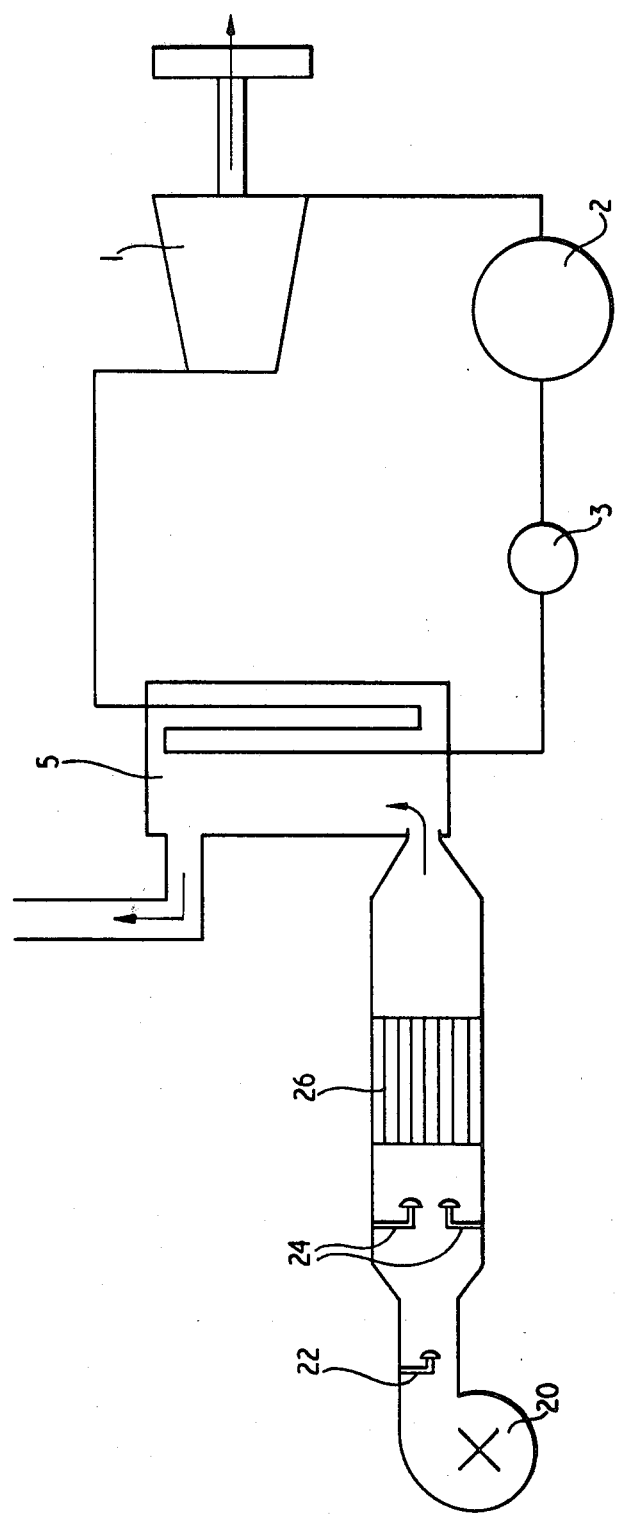

ENGINES

This invention relates to Rankine cycle engines and to improved methods of operation whereby catalytic oxidation of a major proportion of the fuel takes place in the boiler section of the engine.

The Carnot cycle is the most efficient heat engine which for a wet vapour consists of four stages. Heat is supplied to the working fluid at constant temperature and pressure followed by isentropic expansion of the vapour. In the third stage heat is rejected isothermically and finally the fluid is isenthropically compressed. This theoretical cycle cannot be followed in practise and the modified cycle is called the Rankine cycle which is less efficient. The basic machinery for this type of engine comprises a boiler, an expander (means for allowing the working fluid to expand), a condenser and a feed pump.

An object of the present invention is to produce a Rankine cycle engine in which the boiler unit comprises a catalytic combustor, such that the engine may be used in conditions where there are limits on noise, pollutants, in exhaust gases and flamable substances.

According to one aspect of the present invention the boiler unit of a Rankine cycle engine includes a catalytic combustor having a thermally stable and oxidation resistant monolith containing a multiplicity of flow paths and channels constituting or supporting a catalyst for the catalytic combustion of the combustible gases and injected fuel.

According to another aspect of the present invention, the boiler unit of the Rankine cycle engine comprises:
 (a) a fan for producing a supply of air to a combustor;
 (b) a pilot burner fuelled by a fuel injector;
 (c) at least one injector for injecting the remaining fuel into the gaseous stream;
 (d) a catalytic combustor section comprising a temperature stable oxidation resistant monolith, the monolith providing catalytic channels for contact with and passage of the gases combined with injected fuel at stage (c) such that catalytic combustion of the uncombusted fuel takes place but in which a pressure drop of 10% or less is produced, and
 (e) means for transferring heat from the stream of hot gaseous fluid to the working fluid of the Rankine cycle engine.

In section (a) the temperature of the air is between 0° C. and 600° C. and at a pressure within the range 1 atmosphere to 20 atmospheres. In the following section, section (b), the pilot burner burns up to approximately 5% by weight of the total fuel consumption of the engine at fuel power. The proportion of the fuel utilised by the pilot burner during normal running may range from 0.16% by weight to 66⅔% by weight. The fuel injection for the pilot burner (b) is able to control the quantity of fuel and is adjusted primarily to give a temperature within a specific preferred range in the combustion section (d). A typical preferred temperature range in the combustion section is 200° C. to 500° C.

The remainder of the fuel is injected into the gaseous stream, in section (c), by one or more fuel injectors, the number of which and their configuration will be dependent on the condition of operation of the engine.

Preferably the monolith in section (d) is metallic and is formed from one or more metals selected from the group comprising Ru, Rh, Pd, Ir and Pt. However base metals may be used or base metal alloys which also contain a platinum group metal component may be used.

The walls of the metallic monolith preferably have a thickness within the range 2-4 thousandths of one inch. The preferred characteristics of the metallic monolith having catalyst deposited thereon are (i) that it presents low resistance to the passage of gases by virtue of its possession of a high ratio of open area to blocked area and (ii) that it has a high surface to volume ratio.

A typical 200 cells per square inch ceramic monolith has walls 0.008–0.011 inches thick, a 71% open area and a 15% pressure drop. A typical 400 cells per square inch metallic monolith of the present invention has walls 0.002 inches thick, a 91–92% open area and a 4% pressure drop. A 200 cell per square inch metallic monolith has a 95% open area and a pressure drop of 4% or less.

Suitable platinum group metals for use in fabrication of the metallic monolith are platinum, 10% rhodium-platinum and dispersion strengthened platinum group metals and alloys as described in British Patent Nos. 1,280,815 and 1,340,076 and U.S. Pat. Nos. 3,689,987, 3,696,502 and 3,709,667.

Base metals which may be used are those capable of withstanding rigorous oxidising conditions. Examples of such base metal alloys are nickel and chromium alloys having an aggregate Ni plus Cr content greater than 20% by weight and alloys of iron including at least one of the elements chromium (3–40)wt.%, aluminium (1–10)wt.%, cobalt (0–5)wt.%, nickel (0.–72)wt.% and carbon (0–0.5)wt.%. Such substrates are described in German OLS No. 2450664.

Other examples of base metal alloys capable of withstanding the rigorous conditions are iron-aluminium-chormium alloys which may also contain yttrium. The latter alloys may contain 0.5–12 wt.% Al, 0.1–3.0 wt.% Y, 0–20 wt.% Cr and balance Fe. These are described in U.S. Pat. No. 3,298,826. Another range of Fe-Cr-Al-Y alloys contain 0.5–4 wt.% Al, 0.5–3.0 wt.% Y, 20.0–95.0 wt.% Cr and balance Fe and these are described in U.S. Pat. No. 3,027,252.

Base metal alloys which also contain a platinum group metal component are useful as a catalytic metallic monolith in very fierce oxidising conditions. Such alloys are described in German DOS No. 2530245 and contain at least 40 wt.% Ni or at least 40 wt.% Co, a trace to 30 wt.% Cr and a trace to 15 wt.% of one or more of the metals Pt, Pd, Rh, Ir, Os and Ru. The alloys may also contain from a trace to the percentage specified or any one or more of the following elements:

|  | % by weight |
| --- | --- |
| Co | 25 |
| Ti | 6 |
| Al | 7 |
| W | 20 |
| Mo | 20 |
| Hf | 2 |
| Mn | 2 |
| Si | 1.5 |
| V | 2.0 |
| Nb | 5 |
| B | 0.15 |
| C | 0.05 |
| Ta | 10 |
| Zr | 3 |
| Fe | 20 |
| Th and rate earth metals or oxides | 3 |

Where the metallic substrate is composed either substantially or solely or platinum group metal it may be in the form of an interwoven wire gauze or mesh or corrugated sheet or foil. Where the metallic substrate is composed substantially of base metal it is preferably in the form of corrugated sheet or foil. These types of base metal monoliths are also described in German OLS 2450664 and they may be used in the combustor according to the present invention. Such base metal monoliths may have deposited thereon a first layer comprising an oxygen containing coating and a second and catalytic layer. The oxygen containing coating is usually present as an oxide selected from the group consisting of alumina, silica, titania, zirconia, hafnia, thoria, beryllia, magnesia, calcium oxide, strontium oxide, barium oxide, chromia, boria, scandium oxide, yttrium oxide and oxides of the lanthanides. Alternatively, the oxygen in the first layer is present as an oxygen containing anion selected from the group consisting of chromate, phosphate, silicate and nitrate. The second catalytic layer may, for example, comprise a metal selected from the groups consisting of Ru, Rh, Pd, Ir, Pt, Au, Ag, an alloy containing at least one of the said metals and alloys containing at least one of the said metals and a base metal. The first and second layers may be deposited or otherwise applied to the monolith as described in German OLS No. 2450664.

Alternative catalytic monoliths for use in section (f) are the structures defined in British Patent Application 51219/76 dated Dec. 8, 1976.

In British Patent Application 51219/76 there is described a catalyst comprising a metallic substrate having deposited thereon a surface coating consisting of one or more intermetallic compounds of the general formula $A_xB_y$ where A is selected from the group consisting of Al, Sc, Y, the lanthanides, Ti, Zr, Hf, V, Nb and Ta and x and y are integral and may have values of 1 or more.

In British patent application No. 51219/76 the surface coating of intermetallic compound is, preferably, in the form of a thin film ranging in thickness from 2 to 15 microns.

Many compounds of the type $A_xB_y$ are miscible with one another and structures in which the surface coatings deposited upon the said metallic substrate contains more than one compound of the type $A_xB_y$ are within the scope of this invention.

When the intermetallic compound is deposited in the form of a coating not more than 15 microns thick upon the surface of a metallic substrate, excessive brittleness is absent and the coated substrate may be handled normally.

A number of different techniques may be employed to produce a coating in the form of a thin film of intermetallic compound upon the surface of the metal metallic monolith. For example, aluminium may be deposited onto the surface of rhodium-platinum gauzes by a pack-aluminising process. In this process the gauzes are packed into a heat-resistant container in an appropriate mixture of chemicals such that aluminium is transferred via the vapour phase to the gauze surface. At the aluminising temperature, typically 800°–900° C., interaction between the platinum and aluminium occurs to give the required intermetallic compound.

Alternatively chemical vapour deposition from $ZrCl_4$ can be used to form a layer of $Pt_3Zr$, or electrodeposition may be used either from aqueous or fused salt electrolysis to give the requisite compound.

Whichever method is adopted the objective is to form a layer of a firmly adherent, intermetallic compound on the wires of the gauze pack or other substrate.

In another technique, the metals forming the intermetallic compound are prepared as an appropriate solution in water or an organic solvent. The compound is caused to deposit upon the metallic substrate or gauze by the addition of a reducing agent. The metallic substrate is placed in the solution whilst the precipitation is taking place and becomes coated with a uniform, microcrystalline layer of the intermetallic compound.

The catalyst is preferably a metal selected from the group consisting of Ru, Rd, Pd, Ir, Pt and alloys of the said metals with each other and with one or more base metals such that at least 10% by weight of the said catalyst is PGM. Depending on the monolith and catalyst chosen an intermediate washcoat layer may be applied comprising a high surface area refractory metal oxide.

A Rankine engine in accordance with the invention, will now be described by way of example with reference to the accompanying drawing which shows the engine diagrammatically.

Referring to the drawing the components of the Rankine cycle engine using steam as the working fluid are a boiler, 5, an expander, 1, a condenser, 2, and a feed pump, 3. The working fluid may be air, water, or organic fluid or a liquid metal. Water is the most frequently used working fluid due to its availability and cheapness but there are a number of disadvantages which can be overcome if an organic fluid or a liquid metal is used. Toluene and hexafluorbenzene are recognized working fluids. The choice of fluid will depend on factors such as the size of the engine and the cost. Modifications have to be made to the engine when using either a liquid metal or an organic fluid. If a turbine is used as the expander, the turbine, generator and the feed pump may be positioned on the same shaft. When an organic fluid is used a regenerator is included to transfer the heat of desuperheating to the boiler feed heating.

The operation of the boiler unit combustor is as follows: a fan, 20, or similar apparatus such as a compressor provides the inlet of air which is heated by a pilot burner, 22. The supply of fuel to the pilot burner is adjusted for an optimum air temperature over the catalyst supported by the monolith. The remainder of the fuel is injected by fuel injectors 24 into the flow of hot air prior to the monolith, 26. Catalytic combustion of the fuel takes place. The hot exhaust gases are used to heat the working fluid of the Rankine cycle engine.

The fuel system and air supply may be driven by any convenient means which is best suited to the environment in which the engine is being operated. For example if the invention was to be used in mines electrical drive motors would be used that were Buxton-certified flame-proof.

The expander unit can be a positive displacement engine or a turbine. The choice will be governed by the application for which the Rankine cycle engine will be used.

In a Rankine engine according to the invention, the catalyst was supported on a monolith made from an Fe-Cr-Al-Y alloy as previously described in the specification. The monolith had a cell density of 400 cells per square inch, a diameter of three inches and a length of three inches. The catalyst used was platinum having a loading of 150 grams per cubic foot and, prior to applying the catalyst, the monolith was precoated with a washcoat layer comprising aluminium and barium.

The engine was supplied with inlet air at a rate of 42 cubic feet per second which was heated by the pilot burner 22 to a temperature of 38° C. The remainder of the fuel was injected into the gas stream at a position upstream of the catalyst. The exhaust gases leaving the catalyst had a temperature of 625° C. and the wire fed to the boiler where steam was raised. The exhaust gases leaving the boiler had a temperature of 80° C. and a portion of the steam was used to power a double-acting steam piston engine rated at 3 BHP.

Using a gaseous fuel of carbon monoxide and carbon dioxide and nitrogen and a BTU rating of 80 BTU cubic feet, the level of pollutants present in the exhaust gas is given below for a stable combustion run time of 380 hours and a catalyst light-off temperature of 200° C.
Carbon Monoxide—11 ppm.
Hydrocarbons—18 ppm.
NOX—zero ppm.

Using butane in nitrogen as fuel and under the same conditions as above but with a stable combustion run time of 600 hours, the pollutants present in the exhaust gas were:
Carbon monoxide—7 ppm.
Hydrocarbons—16 ppm.
NOX—zero ppm.

I claim:

1. A Rankine cycle engine including a boiler unit comprising a catalytic combustor; a fan for producing a stream of air to said combustor wherein the temperature of the air is between 0° and 600° C. and the pressure is between 1 and 20 atmospheres; a pilot burner; and fuel injector means for fueling said pilot burner and further means for injecting the remaining fuel into the stream of air; said catalytic combustor comprising a temperature stable oxidation resistant monolith, the monolith providing catalytic channels for contact with and passage of the air combined with injected fuel such that catalytic combustion of the fuel takes place therein but with a pressure drop of 10% or less, and means for transferring heat from the stream of hot gaseous fluid to the working fluid of the Rankine cycle engine, the monolith comprising at least one of the metals Ru, Rh, Pd, Ir and Pt, a base metal, a base metal alloy or a base metal alloy containing at least one platinum group metal.

2. An engine according to claim 1 wherein the monolith is made from a 10% Rh-Pt alloy.

3. An engine according to claim 1 wherein the base metal alloy contains Ni and Cr having an aggregate Ni plus Cr content greater than 20% by weight.

4. An engine according to claim 1 wherein the base metal alloy includes at least one of the elements chromium (3–40)wt.%, aluminium (1–10)wt.%, cobalt (0–5)wt.%, nickel (0–72)wt.% and carbon (0–0.5)wt.% and balance iron.

5. An engine according to claim 1 wherein the base metal alloy comprises 0.5–12 wt.% Al, 0.1–3.0 wt.% Y, 0–20 wt.% Cr and balance Fe.

6. An engine according to claim 1 wherein the base metal alloy comprises 0.5–4 wt.% Al, 0.5–3.0 wt.% Y, 20.0–95.0 wt.% Cr and balance Fe.

7. An engine according to claim 3 wherein the base metal alloy monolith has a first coating of an oxygen containing material applied thereto and a second coating of a catalytic material applied to the first coating.

8. An engine according to claim 7 wherein the first coating includes at least one oxide selected from the group consisting of alumina, silica, titania, zirconia, hafnia, thoria, beryllia, magnesia, calcium oxide, strontium oxide, barium oxide, chromia, boria, scandium oxide, yttrium oxide and oxides of the lanthanides or an oxygen containing anion selected from the group consisting of chromate, phosphate, silicate and nitrate.

9. An engine according to claim 7 or claim 8 wherein the catalytic material is selected from the group consisting of Ru, Rh, Pd, Ir, Pt, Au, Ag, an alloy containing at least one of the said metals and alloys containing at least one of the said metals and a base metal.

* * * * *